(12) United States Patent
Johnson et al.

(10) Patent No.: US 9,908,642 B1
(45) Date of Patent: Mar. 6, 2018

(54) BIOLOGICALLY INSPIRED RADIATION REFLECTOR

(71) Applicant: The United States of America as Represented by the Administrator of the National Aeronautics & Space Administration (NASA), Washington, DC (US)

(72) Inventors: Sylvia M. Johnson, Alameda, CA (US); John W. Lawson, Mountain View, CA (US); Thomas H. Squire, Alameda, CA (US); Michael Gusman, Palo Alto, CA (US)

(73) Assignee: The United States of America as Represented by the Administrator of NASA, Washington, DC (US)

( * ) Notice: Subject to any disclaimer, the term of this patent is extended or adjusted under 35 U.S.C. 154(b) by 402 days.

(21) Appl. No.: 14/604,553

(22) Filed: Jan. 23, 2015

Related U.S. Application Data

(60) Provisional application No. 61/930,903, filed on Jan. 23, 2014.

(51) Int. Cl.
*B64G 1/54* (2006.01)
*B64G 1/58* (2006.01)
*C04B 35/626* (2006.01)

(52) U.S. Cl.
CPC ............... *B64G 1/54* (2013.01); *B64G 1/58* (2013.01); *C04B 35/62685* (2013.01); *C04B 2235/3418* (2013.01); *C04B 2235/401* (2013.01); *C04B 2235/46* (2013.01)

(58) Field of Classification Search
CPC ............... B64G 1/54–1/546; C04B 35/62685
See application file for complete search history.

(56) References Cited

U.S. PATENT DOCUMENTS

2008/0038170 A1* 2/2008 Sandhage ........... B81C 99/0095
423/155

OTHER PUBLICATIONS

Johnson, et al., Radiation Reflecting Ablators: Requirements and Realizations, 2nd Carbon Phenolic Workshop, Apr. 3-4, 2012, Ames Research Center, Moffett Field, CA.*
Carslaw, et al., Conduction of Heat in Solids, 1946, 70-73, Oxford University Press, Amen House, London E.C.4.
Losic, et al., Pore Architecture of Diatom Frustules: Potential Nanostructure . . . , Journal of Nanoscience and Nanotechnology, 2006, 1-8, 6-4, American Scientific Publishers.
(Continued)

*Primary Examiner* — Alex A Rolland
(74) *Attorney, Agent, or Firm* — John F. Schipper; Robert M. Padilla; Mark P. Dvorscak

(57) ABSTRACT

A thermal protection system (TPS) comprising a mixture of silicon carbide and $SiO_x$ that has been converted from Si that is present in a collection of diatom frustules and at least one diatom has quasi-periodic pore-to-pore separation distance d(p-p) in a selected range. Where a heat shield comprising the converted $SiC/SiO_x$ frustules receives radiation, associated with atmospheric (re)entry, a portion of this radiation is reflected so that radiation loading of the heat shield is reduced.

12 Claims, 7 Drawing Sheets

(56) References Cited

OTHER PUBLICATIONS

Komarevskiy, et al., Potential of glassy carbon and silicon carbide photonic structures as electromagnetic radiation shields . . . , Optics Express, Jun. 11, 2012, 1-12, 20-13.
Johnson, et al., Biologically-Derived Photonic Materials for Thermal Protection Systems, 38th Annual Conference on Composites, Materials, and Structures, Jan. 27-30, 2014.

* cited by examiner

BIOLOGICALLY INSPIRED RADIATION REFLECTOR

CROSS-REFERENCE TO RELATED APPLICATIONS

This application claims the benefit of U.S. Provisional Application No. 61/930,903, filed Jan. 23, 2014.

ORIGIN OF THE INVENTION

The invention described herein was made in the performance of work under a NASA contract and by employees of the United States Government and is subject to the provisions of Public Law 96-517 (35 U.S.C. § 202) and may be manufactured and used by or for the Government for governmental purposes without the payment of any royalties thereon or therefore. In accordance with 35 U.S.C. § 202, the contractor elected not to retain title.

FIELD OF THE INVENTION

This invention relates to use of innovative materials in a thermal protection system (TPS) for a re-entry vehicle.

BACKGROUND OF THE INVENTION

There is a clear and continuing need for a thermal protection system (TPS) for a re-entering vehicle (RV) that can withstand heating from a high speed entry or re-entry into an atmosphere of a planetary body that is adaptable enough to accommodate human missions and robotic missions. RV surface heating has two primary sources (1) convective heating (proportional to $(velocity)^3$) from flow of hot gases past the surface and from chemical combination reactions in the gases; and (2) radiation heating (approximately proportional to $(velocity)^8$) from a shock wave that forms preceding the RV).

During high speed initial atmospheric entries, as much as 90 percent of the surface heating can arise through radiation from a reacting shock layer. Where a substantial part of this radiation can be reflected from a heat shield, and prevented from contacting or directed away from the RV surface, the overall heat load can be reduced accordingly, which allows reduced heat shield mass and corresponding greater payload mass for the re-entrant vehicle. Where a TPS can be developed that withstands a large portion of the convective and radiative heating encountered during a high velocity planetary entry, the risk for a crewed mission is reduced, and shorter transit times and higher re-entry velocities, exceeding 15 km/sec (33,651 mi/hour), can be used.

Radiative heating of an RV and its heat shield peaks early in a re-entry interval into an atmosphere, and this heating often arises from specific, limited ranges of wavelengths of concern, $\{\lambda_{rad}\}$, dependent upon atmospheric composition, as indicated in FIG. 1. Provision of a heat shield that has an approximately periodic structure that is preferentially reflective for wavelengths in the range $\{\lambda_{rad}\}$ would reduce the fraction of radiation that contacts the RV surface. However, construction of such a heat shield is likely to be expensive and technically demanding. Preferably, the primary heat shield material is refractory and has a high phase change temperature for ablating.

SUMMARY OF THE INVENTION

These needs are met by the invention, which provides a new heat shield material that: (1) is initially a natural material with a quasi-periodic pore sub-structure; and (2) is processed to form a refractory mixture (e.g., SiC and $SiO_x$) with superior radiation reflection, phase change and thermal characteristics over the wavelength range $\{\lambda_{rad}\}$. The initial natural material is a collection of diatoms, comprising primarily $SiO_x$ and having pore-to-pore separations d, within an individual diatom, in a selected range D1≤d≤D2(D1 and/or D2≤100 nm), with particular diatoms preferably chosen for desired diatom pore dimensions. These diatoms react with gaseous Mg at T=600° C. to form MgO, which is leached from the diatom structure with an acid to form a pure Si frustule. The frustule is then reacted with $H_2$ and a hydrocarbon gas, such as $CH_4$ or $C_2H_4$ or $C_2H_6$, to form a mixture of $SiO_x$ and SiC (crystalline and/or amorphous), with the degree of crystallinity being estimatable by X-ray diffraction. MgO is formed in preference to formation of either of the compounds, MgSi and/or $MgSiO_4$, which would resist removal of the Mg.

A heat shield material additive, comprising a mixture of SiC and $SiO_x$ with a quasi-periodic diatom pore structure and prepared in this manner, may have a high phase change temperature (melting, ablation, evaporation, sublimation, etc.), and has a bulk optical reflectivity OR of at least about 0.19 or 0.033 for normal incidence. Incident radiation may also be photonically reflected at much higher values of OR. Other processing details are discussed in a Description of the Invention. The optical reflectivity value OR tends to increase with increasing incidence angle of radiation received at the heat shield component.

The additive may be a continuous layer. Alternatively, the additive is incorporated onto an exposed surface of the substrate heat shield material by impregnation, coating or similar techniques that may produce non-continuous or isolated deposits the additive. This reflecting additive layer would be operate primarily during an initial time interval (e.g., the first 30-60 sec of re-entry).

BRIEF DESCRIPTION OF THE DRAWINGS

FIG. 1 includes, for comparison, a Planck spectrum (PR) of black body radiance and cumulative radiance (CR) for a temperature T=4,000° C. (4273° K).

Figure 1:
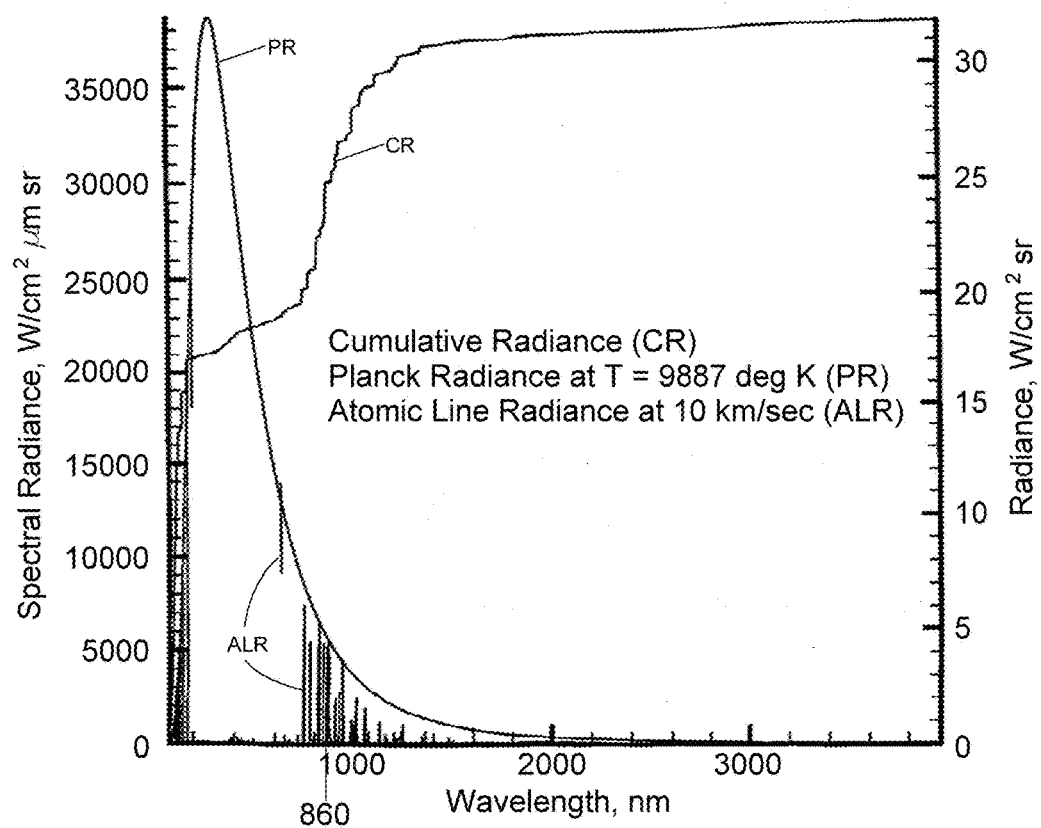
FIG. 1 graphically presents an estimate of a radiation spectrum provided by shock layer atomic line radiance (ALR), as a function of wavelength λ for an assumed shock layer temperature T(rad;SL))≈10,000° C. and a corresponding estimated heat shield temperature T(rad;HS)≈4,000° C., in an environment that is initially substantially free of atomic oxygen.

DESCRIPTION OF THE INVENTION.

The invention relies for the initial (natural) material upon diatoms containing diatomite (diatomaceous earth), a sedimentary rock composed of fossilized skeletons of diatoms, which are one-celled, algae-like, micron-sized, mostly photosynthetic phytoplankton. Diatomite composition is mainly amorphous $SiO_x$, with a quasi-periodic arrangement of interconnected pores of nanometer size. These quasi-periodic structures give diatom some useful photon interaction characteristics.

Each diatom is bounded by a silica frustule or cell wall, including two valves of slightly different size that fit together in a connective zone, known as a girdle, and enclose the remainder of a diatom. An estimated 100,000 species of diatoms are extant in the oceans, usually restricted to the photic zone. Diatom diameters normally range from 40 nm to 200 μm, with pore-to-pore separations that are consistent with a preferred wavelength range $\{\lambda_{rad}\}$.

The diatoms initially comprise $SiO_x$. A goal here is to transform the diatoms into a material with higher phase change temperature, while retaining a quasi-periodic pore structure within a diatom that provides an enhanced photon-reflecting structure.

The transformation or conversion process begins with addition of Mg(gas) to a powder bed of diatom frustules, which comprise $SiO_x$, (x≥1) in a heated Fluid Bed Reactor (FBR) at a temperature T(FBR)≈600° C. Mg(solid) is heated and Mg(gas) particles react with $SiO_2$ to form MgO in a first reaction, $$2Mg(gas)+SiO_2+Ar \rightarrow Si(solid)+2MgO(solid)+Ar. \quad (1)$$

We have found that use of high heating rates in this reaction, together with extended temperature pauses at T≥850° C., produce competing magnesium silicides (MgSi) and magnesium silicates ($MgSiO_4$), which are compounds that will not leach or surrender the Mg (undesirable). Use of moderate temperatures, preferably no higher than T=640-800° C. and for no longer than a selected time interval, Δt1=8 hours, in this reaction, are preferred. Particle size of the Mg reactant is important. Use of smaller diameter Mg particles (dia≤100 μm) allows use of lower temperature ramp rates and a longer low temperature pause, with T≤600° C., which avoids or minimizes damaging exothermic reactions.

We have also found that Mg particles react with the crystalline $SiO_2$ quartz walls of the FBR and undergo the same conversion process as amorphous $SiO_2$ frustules, but with reaction rates much lower than the $SiO_2$ frustules. This lower reaction rate damages the FBR.

In a second reaction, MgO is leached from the diatom structure with HCl or another modest strength acid to provide frustule structures containing primarily Si, $$Si+MgO+2HCl+Ar \rightarrow Si+MgCl_2+H_2O+Ar, \quad (2)$$

In a third reaction, the Si frustule is reacted with a hydrocarbon gas ($CH_4$, $C_2H_4$, $C_2H_6$, etc,) and with $H_2$ gas in the FBR to form an SiC frustule, $$Si+CH_4+H_2Ar \rightarrow SiC+3H_2+Ar. \quad (3\text{-}1)$$

$$2Si+C_2H_4+H_2+Ar \rightarrow 2SiC+3H_2+Ar. \quad (3\text{-}2)$$

$$2Si+C_2H_6+H_2+Ar \rightarrow 2SiC+4H_2+Ar. \quad (3\text{-}3)$$

An assembly of SiC frustules, formed at temperatures (T≤800° C., preferably T≤650° C.), will likely be amorphous. SiC frustules formed in the third reaction (3-1,2,3) will require higher temperatures to increase crystallinity fraction. Conversion to SiC frustules may be faster and use lower temperatures than normal. Conversion of the $SiO_x$ to SiC by this process may not be complete so that the substances produced by this process may be a mixture comprising SiC and $SiO_x$.

Figure 2:
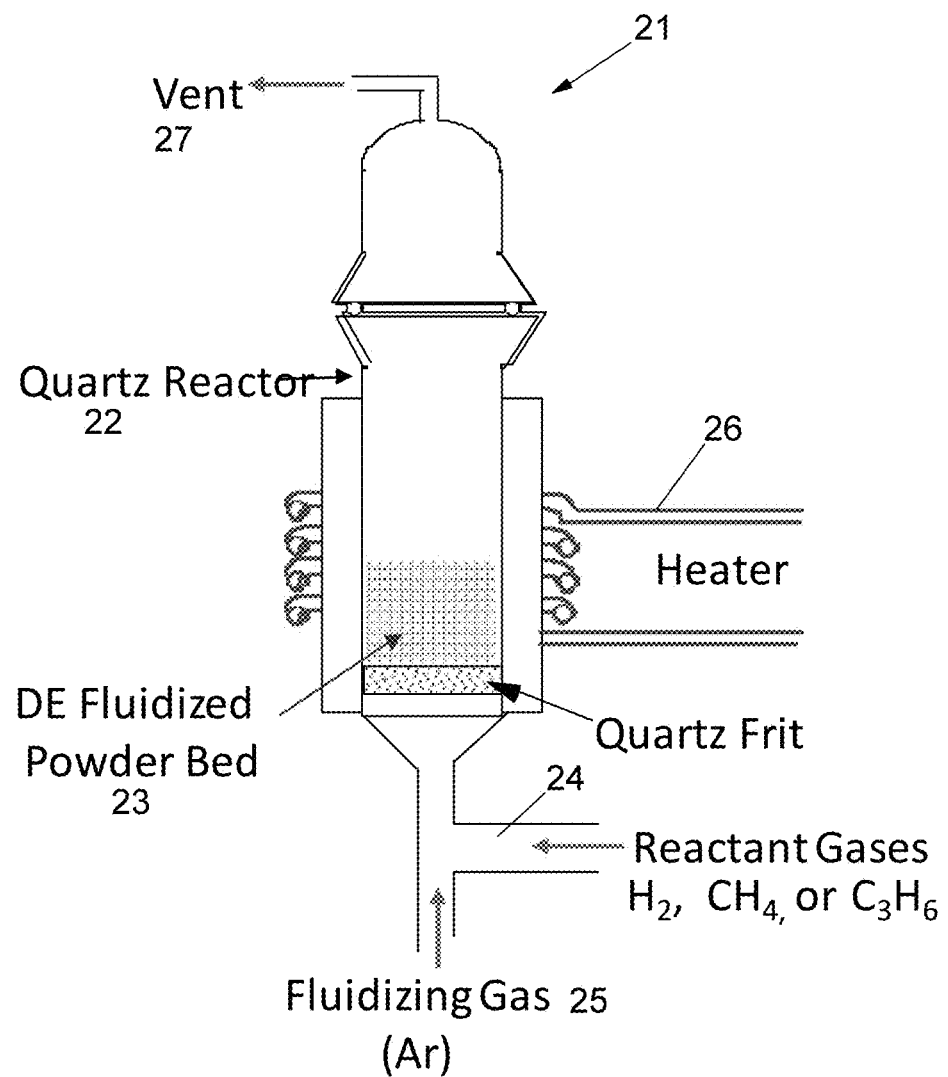
FIG. 2 schematically illustrates an FBR conversion method used here.

FIG. 2 schematically represents a Fluidized Bed Reactor (FBR) 21 that can be used for the transformation of the diatom powder to SiC and $SiO_x$. The FBR includes a quartz reactor vessel 22 that facilitates the three reactions set forth in Eqs. (1), (2) and (3-1) or (3-2) Or (3-3). A fluidized powder bed 23 provides an initial reaction site. Reactant gases are received by the bed from a reactant source 24 and passed through the bed, together with a fluidizing gas from a fluidizing source 25. Heat is provided by a high temperature source 26. The resulting gases are drawn off through a vent 27.

Processing parameters are continually adjusted in attempting to optimize the partial or total conversion of amorphous $SiO_x$ frustules to SiC. Pore structure and almost-periodic atomic structure are maintained, but further improvements are needed to achieve full conversion to SiC; some $SiO_x$ may remain in the mix.

Some refinements or modifications to the conversion process include: (1) using lower FBR heating rates and an extended temperature pause at T≈640° C. (just below the melt point of Mg, T=650° C.) to encourage more complete conversion of Mg to MgO in the first reaction; (2) replacing methane ($CH_4$) with more reactive, alternative, double bond gases, such as ethylene ($C_2H_4$) or ethane ($C_2H_6$) in the third reaction; (3) using a higher concentration of $H_2$, rather than Ar, in the third reaction, in order to improve distribution of Mg(gas) throughout the FBR, relying on the smaller molecular size of $H_2$; and (4) providing the FBR with an improved wall liner that resists converting $SiO_x$ at the wall to Si.

The SiC produced in the third reaction is an α-polytype or a β-polytype, having a melt temperature in a range T(melt)= 2650-2730° C. and a sublimation temperature in a range T(sublim)=2,200-2,700° C. Radiation from the shock layer, plus convective heating, is believed to provide heat shield surface temperatures T(rad;HS) as high as 4,000° C. for an RV entering or re-entering a planetary atmosphere at a velocity of 10 km/sec (22,474 mi/hr).

It is not yet known which SiC polytype(s) will be produced by the frustule reactions set forth in the preceding first, second and third reactions.

The $SiO_x$ that may result from the process set forth in Eqs. (1), (2) and (3-1,2,3) has a melt temperature range T(melt)= 1600-1725° C. and an evaporation temperature range T(evap)≥2230° C.

The Si that may result from the process set forth in Eqs. (1), (2) and (3) has a melt temperature range T(melt)≈1414° C. and an evaporation temperature T(evap)≈3265° C.

Estimation of Heat Shield Optical Reflectivity for SiC and $SiO_x$.

Figure 3A:
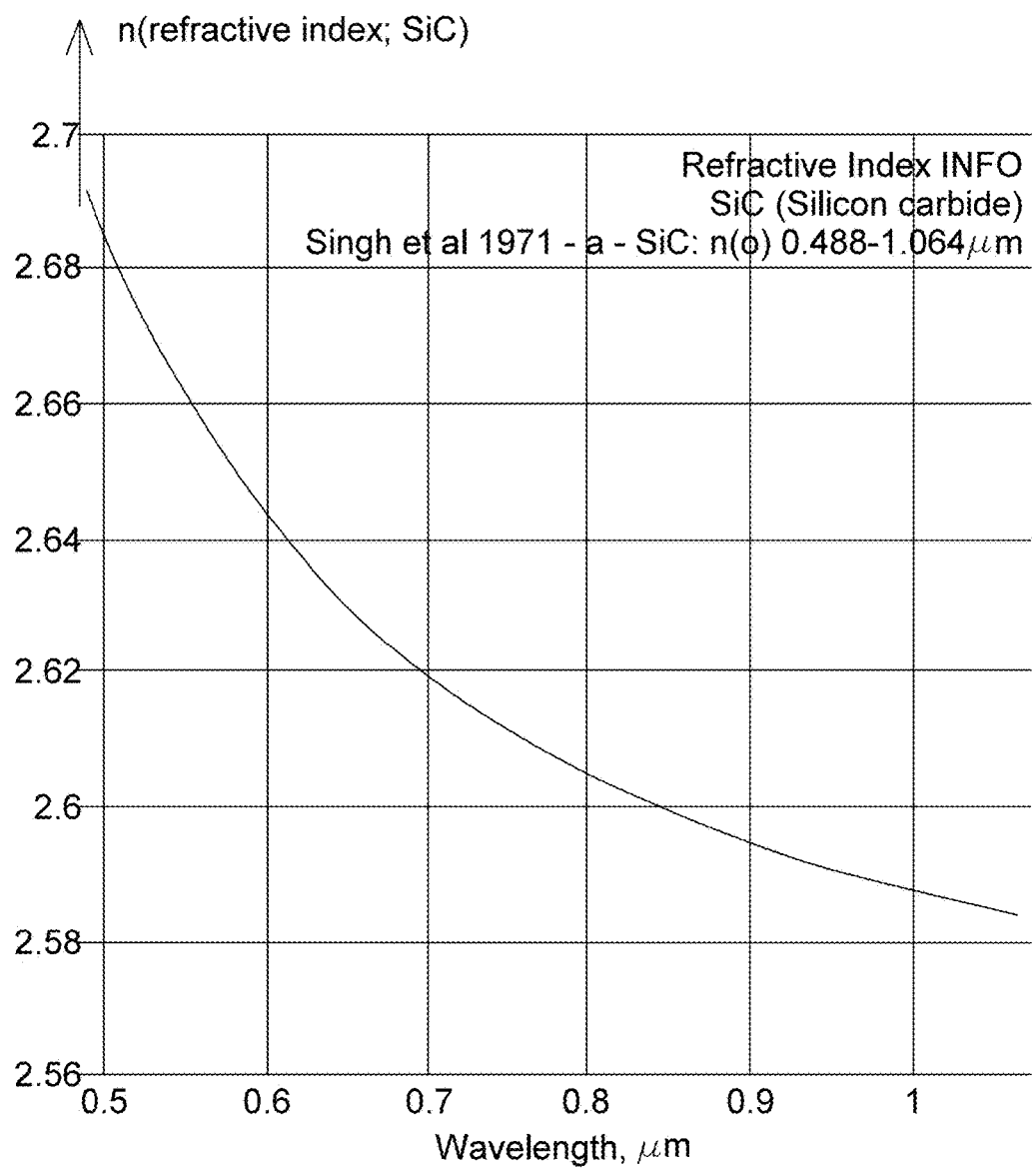
FIGS. 3A and 3B graphically present refractive indices n(λ;T) for SiC and for $SiO_x$ for visible and mid-infrared wavelengths λ.

A first estimate of optical reflectivity OR(λ;T) associated with the first sublayer SubL assumes that all sublimated SiC material is promptly removed from a region adjacent to SubL and that the local environment comprises a heated first sublayer material with an associated refractive index n(λ;T) and a contiguous second layer that is substantially a vacuum, with associated refractive index n≈1, as illustrated in FIG. 3A. Assuming that the first layer/second layer interface IF is not too rough, an abrupt change in refractive index at this interface will have an associated optical reflectivity at normal incidence of $$OR(\lambda;T)=\{(n(\lambda;T)-1)/(n(\lambda;T)+1)\}^2, \quad (4)$$

which has a value of about 0.204 for room temperature SiC and for a wavelength λ=589 nm. This ignores a small difference between ordinary and extraordinary refractive indices, $n_o$=2.648 and $n_e$=2.691, of SiC at these conditions.

Estimates of variation of refractive index $n(\lambda;T)$ with wavelength $\lambda$ for bulk SiC, illustrated in FIG. 3A, indicate that the index decreases from about $n(\lambda;T)=2.69$ at $\lambda=500$ nm toward $n(\lambda;T)=2.55$ as wavelength $\lambda$ increases toward and beyond 3000 nm. From examination of FIG. 1, it appears that (1) peak shock layer radiation intensity occurs at a wavelength $\lambda(SL;peak)\approx 860$ nm, which is consistent with a peak wavelength value, $\lambda(Planck;peak)=676$ nm for a Planck black body radiation curve, using the Wien displacement law, $$\lambda(mm)T(°K)=0.00289, \tag{5}$$

with an assumed temperature of $T=4273°$ K. The wavelength range $\{\lambda_{rad}\}$ of interest in this situation is approximately 190 nm (vacuum uv)$\leq\lambda\leq 3000$ nm so that use of a refractive index, $n(\lambda;T)\geq 2.55$, with associated bulk SiC optical reflectivity, $OR(\lambda;T;SiC)=0.19$, appears to be reasonable for modest temperatures.

Figure 3B:
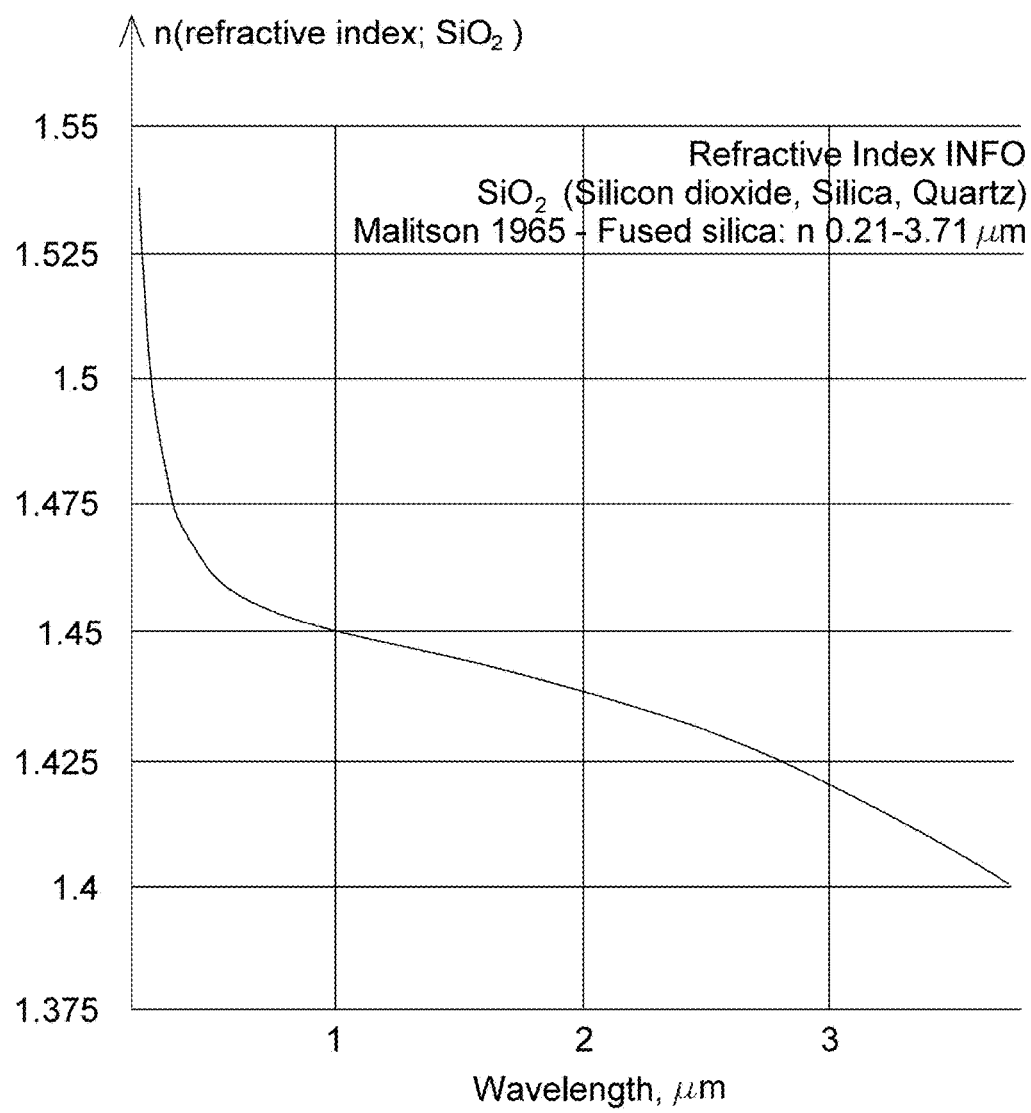

FIG. 3B graphically illustrates variation of refractive index $n(\lambda;T;SiO_x)$ with wavelength for a wavelength range of interest here. Where $SiO_x$ is the bulk material, assuming that the first block/second block interface IF is not too rough, an abrupt change in refractive index of $SiO_x$ at this interface $(n(\lambda;T)=1 \rightarrow n(\lambda;T)=1.45$ at $\lambda=589$ nm) will have an associated optical reflectivity at normal incidence, according to Eq. (4), of $OR(\lambda;T;SiO_x)=0.034$. The refractive index $n(\lambda;T;SiO_x)$ and the optical reflectivity $OR(\lambda;T;SiO_x)$ will decrease further as wavelength increases toward and beyond $\lambda=3000$ nm.

Example: Some Optimal Choices of Diatom Parameters.

The optical reflectivity $OR(\lambda;T)$ of a block of material (not removed) may be enhanced by choosing a diatom species with nearest neighbor pore separation distances d(p-p) (measured laterally) having selected values that are approximately equal to optimal values estimated in the technical literature. For example, in N. Komarevskiy et al, "Potential of glassy carbon and silicon carbide photonic structures as electromagnetic radiation shields for atmospheric re-entry" Optics Express, Vol 20, No 13 (11 Jun. 2012), Sec. 6, Table 2, the authors analyze a "porous reflector" model for SiC. The authors find several pore-to-pore separation distances for optimal reflection of radiation in a wavelength range $\lambda=7200$-1400 nm, which lie in a selected range, d(p-p)=226, 229, 230 and 239 nm (less than about 300 nm), with associated average optical reflectivity parameters ranging from 84 to 97 percent for as few as 1-4 layers of SiC porous reflectors that are simulated. Optical reflectivity values for multi-layer porous reflectors of $SiO_x$ would be similar for corresponding optimal distances d(p-p). This Optics Express article is incorporated by reference herein.

These optical reflectivity values should be compared with the estimated optical reflectivity values of OR=0.19 or OR=0.033 for a bulk volume of SiC or of $SiO_x$, respectively, with no periodic structure assumed. Where an additive material is a mixture of SiC and $SiO_x$, enhanced reflection of wavelengths in corresponding first and second wavelength ranges are likely, with possible further reflection enhancement relative to an additive that contains only SiC or only $SiO_x$, because of broader coverage of the wavelength ranges affected.

Some relevant features and dimensions of diatoms are summarized in an Appendix for this disclosure. A range of optimal pore-to-pore separation distances d(p-p) may change with choice of the material (e.g., SiC or $SiO_x$), with relevant radiation wavelength range, and with other parameters so that the examples given here, d(p-p)=226, 229, 230 and 239 nm (each no more than 300-400 nm), will change according to the physical and geometric situation. Within an individual diatom, the pore-to-pore separation distances d(p-p) will not be precisely the same so that the arrangement of pores will be quasi-periodic rather than strictly periodic. However, from the variety of diatoms available, it is possible to identify and use one or more species with approximately the same (optimal) pore-to-pore separation distances d(p-p).

First Model: SiC/$SiO_x$ Layer Located at Exposed Surface of Heat Shield.

In a first model, the transformed diatom material (SiC or $SiO_x$) is provided as a coating or first sub-layer SubL, located at an exposed surface of the heat shield, and experiences an estimated maximum temperature, from shock layer radiation and convective heating, $T(rad;max;1)\approx 4000°$ C. This maximum HS surface temperature subsequently decreases to lower temperatures over the next 30-60 sec. A first portion of the first sub-layer undergoes phase change in this environment and is treated here as providing no substantial contribution to reflection of radiation received from the shock layer SL. A second (remaining) portion of the first sub-layer is assumed to be intact and to have sufficient (remaining) longitudinal thickness $\Delta h$ to provide an associated optical reflectivity, $OR(\lambda;T)\geq 0.19$ or 0.033, for this second (remaining) portion of the first sub-layer SubL.

A lower bound on an initial longitudinal thickness $\Delta h(min)$ of the first sub-layer SubL can be estimated by the following considerations. Assume that the shock layer radiation power density $P(t=dE/dt(mJoules/cm^2$-sec)) is approximately constant or decreasing with time, where $E(t)$ is cumulative energy deposited. This power density is anticipated to decrease overall with passage of time, after an initial (re)entry time interval, because the velocity of the re-entry vehicle RV will decrease as the RV moves through the atmosphere.

Figure 4:
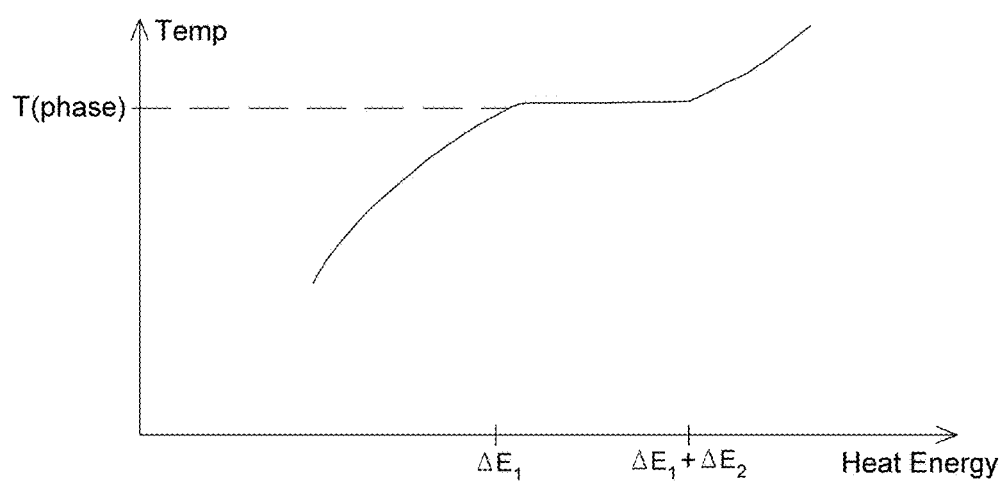
FIG. 4 indicates graphically a development of temperature adjacent to a temperature at which phase change occurs (melting, ablation, evaporation, sublimation, etc.), according to a conventional view.

Phase change of a volume $\Delta V$ of SiC or $SiO_x$ requires provision of at least the following radiant energy: (i) a first energy density component $\Delta E1$ that is required to raise the volume $\Delta V$ from a reference temperature value $T(ref)$ to a phase change initiation temperature $T(phase)$, and (ii) a second measure of energy input $\Delta E2$ required to convert the volume $\Delta V$ of initially solid SiC or $SiO_x$ material at temperature $T(phase)$ to material that has undergone a phase change. With reference to FIG. 4, below and near a phase change temperature $T(phase)$, the temperature of a material increases to $T(phase)$, then appears to plateau at $T=T(phase)$ after the volume $\Delta V$ has reached the first energy content $\Delta E1$. The apparent temperature remains at a value $T(phase)$ while the volume $\Delta V$ accumulates an additional energy increment $\Delta E2$ required for completion of phase change, after which time the temperature may continue to increase, as indicated in FIG. 4 according to a conventional view. This perspective applies for phase change of a volume of SiC or of $SiO_x$.

In a first approximation, it is assumed that each of the energy inputs, $\Delta E1$ and $\Delta E2$, is distributed according to a one-dimensional heat equation for energy distribution, $u(x,t)$=temperature in a semi-infinite solid with thermal conductivity k, specific heat capacity c, density $\rho$, which are temperature-independent, through a solid with cross-sectional area A oriented perpendicular to a direction of transport of temperature.

$$\partial^2 u/\partial x^2 - (1/\kappa)\partial u/\partial t = 0 \quad (0\leq x<\infty) \tag{6}$$

$$\kappa = \rho c/k, \tag{7}$$

$$u(x,t=0)=u0, \tag{8}$$

$$\partial u/\partial x - hu = 0 \text{ at } x=0, \tag{9}$$

Here, the solid is initially at temperature u=0 and is heated by radiation by a source at temperature u0. One solution for this formulation is set forth by H.S. Carslaw and J.C. Jaeger in *Conduction of Heat in Solids*, Oxford Press, 1946, pp. 70-73:

$$u(x,t)/u0 = \text{erfc}(x/2\sqrt{\kappa t}) - \exp(hx + h^2\kappa t)\text{erfc}\{x/2\sqrt{\kappa t} + h\sqrt{\kappa t}\}, \quad (10)$$

$$\text{erfc}(w) = 1 - (2/\sqrt{\pi})\int_w^\infty \exp(-v^2)dv. \quad (11)$$

Figure 5:
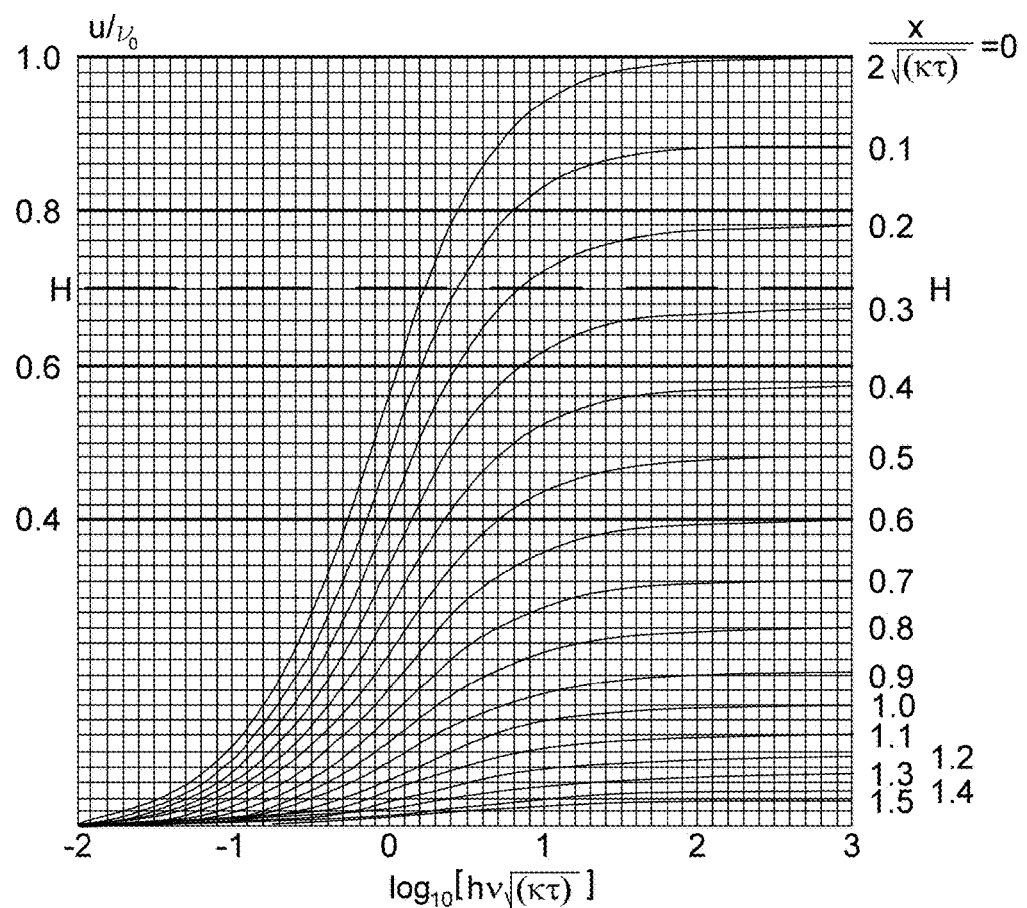
FIG. 5 graphically presents an estimation of solution of heat equation for a semi-infinite, one dimensional solid with radiation input at a boundary.

Adjacent to the boundary, x≈0, the radiation energy deposit in a volume ΔV corresponds to Eq. (9), and the heat energy continues to rise at and near this boundary as long as heat transfer across this boundary continues. FIG. 5, adapted from FIG. 9, page 72 of Carslaw and Jaeger, ibid, graphically presents a sequence of curves providing estimates of temperature u(x,t)/u0 corresponding to constant values of a dimensionless coordinate, $$s = x/\sqrt{4\kappa t}(s = 0, 0.1, 0.2, \ldots, 1.5) \quad (12)$$

When the local heat energy (ρc)u(x,t) reaches a value ΔE1, the temperature in a local volume ΔV has reached a first value at which the phase change process begins. However, the local heat energy (ρc)u(x,t) must reach an energy value, ΔE1+ΔE2, in order to complete the phase change process in the local volume ΔV. This analysis will focus primarily on the total energy, ΔE1+ΔE2 required to complete the phase change process in the local volume ΔV.

Phase change is initiated for a portion of the solid, given by the condition $$0 \leq x \leq x(thr;1) = x(thr;\Delta E1), \quad (13)$$

for which the corresponding heat energy satisfies $$(\rho c)u(x \leq x(thr;1),t) \geq \Delta E1. \quad (14)$$

Phase change, once begun, is completed for a portion of the solid defined by condition $$0 \leq x \leq x(thr;2) = x(thr;\Delta E1 + \Delta E2) \leq x(thr;1), \quad (15)$$

for which the corresponding heat energy satisfies $$(\rho c)u(x \leq x(thr;2),t) \geq \Delta E1 + \Delta E2. \quad (16)$$

The model of phase change represented in FIG. 4 is implemented as follows. For a fixed coordinate value x(≥0) and variable time value t, a measure of heat energy, (ρc)u(x,t), satisfies (ρc)u(x,t)<ΔE+ΔE2 until time t reaches a threshold time value, $$t(thr;2) = t(x;\Delta E1 + \Delta E2), \quad (17)$$

$$(\rho c)u(x, t \geq t(thr;2)) \geq \Delta E1 + \Delta E, \quad (18)$$

where the threshold time value t(x;ΔE1+E2) corresponds to completion of phase change at that value of the coordinate x, and t(x; ΔE1+ΔE2) increases monotonically with increasing x.

In FIG. 5, a horizontal line H-H, corresponding to an arbitrary fraction ψ=u/u0=0.7 of the maximum heat energy value, (ρc)u(x=0,t) present in a volume ΔV, is shown for the normalized temperature u/u0. The line H-H indicates that, for values of the dimensionless coordinate s=x/√4κt greater than s(max)≈0.27, a volume ΔV located at the corresponding coordinate pair (x,t) cannot attain or exceed the corresponding normalized temperature, ψ=u/u0=0.7. Where the fraction ψ=0.7 is interpreted as corresponding to achievement of complete phase change, a volume ΔV, located at a coordinate x corresponding to s>0.27, cannot (yet) complete the phase change. The numerical value of the fraction ψ of maximum heat energy actually chosen will depend upon the power density value provided by the shock layer radiation and upon the total energy, ΔE1+ΔE2 , required for completion of phase change for the volume ΔV. The portion of the solid for which the phase change process is completed may pass away as a gas or vapor so that an initial thickness value τ of the SiC or SiO$_x$ material will decrease as time increases.

Assume that an initial thickness, defined by 0≤x≤τ, of the SiC or SiO$_x$ material is provided at an exposed surface of the heat shield HS for the re-entering vehicle RV and that one wishes to ensure that a portion of this SiC or SiO$_x$ thickness, which is decreasing with passage of time because of phase change, will survive and not disappear during a re-entry survival time interval, 0≤t≤Δt(surv). Completion of phase change for a volume ΔV (heat energy ≥ΔE1+ΔE2) is assumed to correspond to a fraction ψ0 for the dimensionless quantity u/u0 in the sequence of curves presented in FIG. 5. A horizontal line, ψ=ψ0 is drawn in FIG. 5, and a survival value, $$s(\text{surv}) = \tau/\sqrt{4\kappa \Delta t(\text{surv})} \quad (19)$$

of the dimensionless variable s is computed and compared with the horizontal line ψ=ψ0 in FIG. 5. Where the value s(surv) lies above the horizontal line, ψ=ψ0 in a graph corresponding to FIG. 5, a portion of the initial thickness, 0≤x≤τ, of the SiC or SiO$_x$ material will survive the phase change process for (at least) a survival time interval length Δt(surv). The portion of the thickness τ that does not survive the phase change process serves as a sacrificial layer. The fractional value, ψ=ψ0, used here may be used as a zeroth order estimate of optical reflectivity OR for this model.

Where the survival value s(surv) lies on or below the horizontal line, ψ=ψ0, in a graph corresponding to FIG. 5, no portion of the initial thickness, 0≤x≤τ of the SiC or SiO$_x$ material will survive. When the SiC or SiO$_x$ material thickness has decreased below a minimum thickness τ(λ$_{rad}$), dependent upon a representative wavelength λ$_{rad}$ of the incident radiation, optical reflectivity OR from this remaining layer will likely decrease toward 0.

Second Model: SiC/SiO$_x$ Material Deposited in Isolated Clusters at Exposed Surface of Heat Shield.

In a second model, the SiC and/or SiO$_x$ material is deposited in isolated clusters at an exposed surface of another heat shield component on an RV, through impregnation or other deposit process. Each cluster of the SiC and/or SiO$_x$ deposits has a numerical differential area ΔAj (j=1, . . . , J), which is assumed to be at least equal to a threshold value ΔA(thr) required for reflection. The sum $$fA = \sum_{j=1}^{J} \Delta Aj \quad (20)$$

is a fraction f (0<f<1) of the total projected area A of the exposed surface.

A diatom within each of these deposits of transformed diatom material may be treated as comprising a quasi-periodic array of pores that approximately supports reflection of the incident radiation, with an associated optical reflectivity OR(j) that lies between a lower bound, OR(bulk; SiC)=0.19 or OR(bulk;SiO$_x$)=0.033, and a much higher upper bound, OR(photonic), that would be provided by photonic interaction of the incident radiation with a quasi-periodic pore structure. An estimate of overall optical reflectivity for the exposed surface (area A) of the heat shield then becomes $$OR(\text{area } A) = \sum_{j=1}^{J} (\Delta Aj/A) OR(j), \qquad (21)$$

which is bounded by $$f \cdot OR(\text{bulk}) \leq OR(\text{area } A) \leq f \cdot OR(\text{photonic}), \qquad (22)$$

where f is the area fraction determined in Eq. (20). An estimate of incident radiation energy E(rad;HS) received at the heat shield HS, that is reflected by the collection of clusters of transformed diatom material is $$E(\text{refl;HS}) = \{1 - OR(\text{area } A)\} \cdot E(\text{rad;HS}). \qquad (23)$$

Conclusion.

The invention disclosed here incorporates diatom material, transformed or converted into SiC and/or $SiO_x$, as an additive in a heat shield component in order to enhance the thermal protection characteristics in at least one of two ways: (1) increasing temperatures or heat content required for phase change of the material and enhancing refractory behavior of the material; and (2) enhancing photonic behavior and reflection of radiation received by the shield from a shock layer that forms as the RV enters or re-enters the atmosphere of a planetary body. The pore structure within a diatom is quasi-periodic, and an average nearest neighbor pore-to-pore separation distance d(p-p) is preferably chosen to be approximately equal to one or more of the estimated optimal periodicity dimensions. The heat content received by the heat shield and its additive comprises radiation from a shock layer that forms upon RV entry or re-entry and convective heating produced by motion of the RV.

Figure 6:
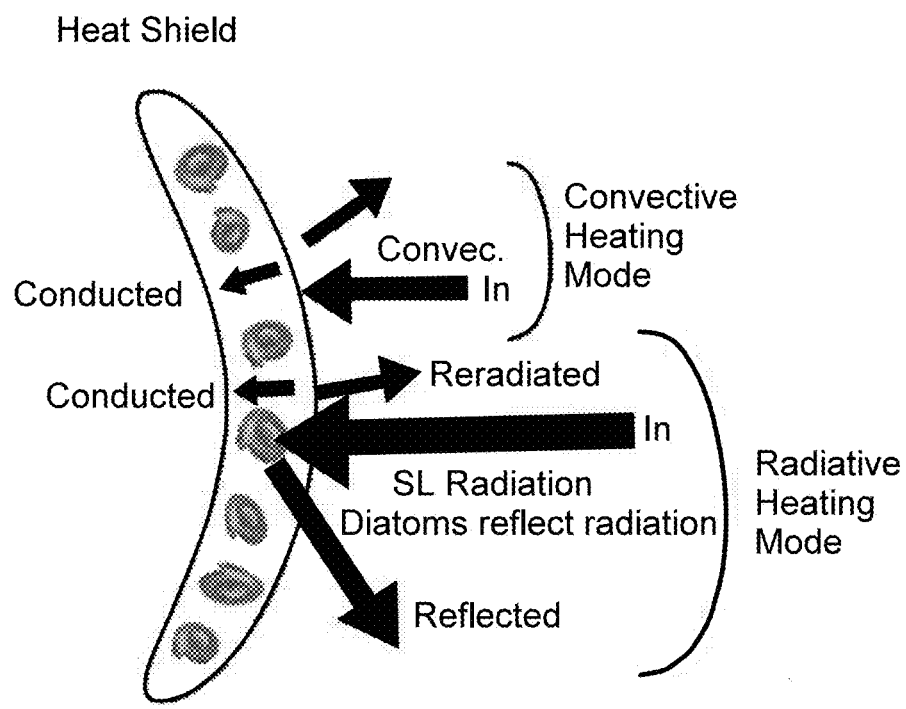
FIG. 6 illustrates reflection/re-radiation that is examined here.

The additive provides (i) enhanced reflection of the radiation of wavelengths in a range that corresponds to wavelengths of the incident radiation and (ii) re-radiation of the convective heating received, at wavelengths that are generally larger than the range of wavelengths that are associated with convective heating. A primary goal is to reduce substantially the convective and radiation heat content that is ultimately absorbed by the heat shield and additive. The diatom material that is processed to provide the additive is initially a naturally occurring material with a quasi-periodic pore structure within each diatom. The reflection of radiation in an associated wavelength range and re-radiation of wavelengths in another (convective heating) range are separately illustrated in FIG. 6.

Appendix. Characterization of Diatoms.

Diatoms are unicellular, eukaryotic, mostly photosynthetic micro-organisms that possess exoskeletons (frustules) comprising amorphous silica ($SiO_x$). Each diatom is bounded by a frustule or cell wall of silica (hydrated $SiO_x$), including two valves of slightly different size that fit together in a connective zone, known as a girdle, and enclose the remainder of a diatom. Diameters of the diatoms lie in a range 2-2,000 μm; some species can be seen with an unaided eye. An estimated 100,000 species of diatoms are extant in the oceans, usually restricted to the photic zone (extending to a depth of about 200 feet). Diatom reproduction is primarily asexual, by binary fission. A typical diatom may have about 11,000 genes. During "bloom and bust" periods, diatoms represent as much as 70 percent of the phytoplankton community and produce about 25 percent of the oxygen on the Earth. A bloom cycle will often terminate because of depletion of available silicon.

Silicon and magnesium compete for oxygen, but Mg appears to be attracted more strongly to oxygen than Si is attracted to oxygen. In one experiment, reported circa 2002, researchers converted all silica in a diatom into magnesium oxide MgO. In another experiment, reported in 2004, a diatom was exposed to titanium dioxide $TiO_2$, which completely replaced the silica in the diatom.

Diatoms are traditionally divided into two orders: Centrales or centric diatoms have pores or apertures that are distributed approximately radially symmetric; and Pennate diatoms have pores or apertures that are distributed approximately bilaterally symmetric. Diatoms of the same species consistently form shells or frustules with the same pattern, which may indicate that the designs are genetically programmed. Frustules of a diatom will usually have pores or apertures, often with pore diameter values d(pore) of about 40 nm, but with nearest neighbor pore separation distances d(p-p) that have a larger range. The limited range of pore diameters d(pore) allows diatom frustules to be used for particle sorting and separation.

Centers of diatom pores appear to be distributed in an approximately hexagonal pattern. Assuming that a regular hexagon pattern is precisely repeated, with a uniform center-to-center separation distance $d(p-p) = 2d_1$, each hexagon is the sum of 12 30-60-90 triangles with hypotenuse length $(2 d1)/\sqrt{3}$ and has an area $$A(\text{hex}) = (6\, d1^2)/\sqrt{3}. \qquad (A-1)$$

Where a single pore of radius $d_2$ is located within this hexagon, the porosity fraction associated with this pattern has a value $$\text{porosity} = (\pi\sqrt{3}/6)(d_2/d_1)^2 \quad (d_2 < d_1). \qquad (A-2)$$

A hydrofluoric acid (HF) solution can be used to increase the pore diameters d(pore) for a given diatom. It is unclear what effect, if any, an HF treatment has on the pore-to-pore separation distance d(p-p).

D. Losic et al, in "Pore Architecture of Diatom Frustules" Jour. Of Nanoscience and Nanotechnology, Vol. 6 (2006) pp 1-8, have measured frustule dimensions statistically for two species, *Coscinodiscus* sp. and *Thalassiosira eccentrica*. For the *Coscinodiscus* sp., average pore diameter, average pore-to-pore distance and average porosity value were $$d(\text{pore}) = 45 \pm 9 \text{ nm},$$

$$\text{porosity} = 7.5 \pm 1.2\%,$$

$$d(p\text{-}p) = 310 \text{ nm (estimate)}.$$

Three porous layers of silica are present, and the pore distribution is approximately radially symmetric for *Coscinodiscus* sp. For the *T. eccentrica* diatom, the corresponding dimensions were $$d(\text{pore}) = 40 \pm 6 \text{ nm},$$

$$\text{porosity} = 10 \pm 2.5\%,$$

$$d(p\text{-}p) = 240 \text{ nm (estimate)}.$$

For *T. eccentric*, two porous layers of silica are present, and the pore distribution is approximately linear (row upon row, referred to as "concentric"), rather than radially symmetric. Pore-to-pore separation distances within an individual diatom can be as large as about 2 μm.

What is claimed is:

1. A method for providing a thermal protection component for a space vehicle that enters or re-enters an atmosphere, the method comprising:
    (1) providing a plurality of particles, comprising Mg, and a powder bed of frustules of $SiO_x$ ($x \geq 1$) from diatom shells in a heated fluidized bed reactor (FBR), where at least one diatom shell has average nearest neighbor pore-to-pore spacing d(p-p) that lies in a selected range, D1≤d(p-p)≤D2, with D1≥100 nm and D2≥400 nm;

(2) heating the plurality of particles and the $SiO_x$ powder bed to a first temperature no greater than about 800° C., and allowing at least a portion of the particles and the $SiO_x$ powder bed to react to form MgO and Si;

(3) leaching MgO to provide a first mixture comprising Si particles and $SiO_x$ particles;

(4) providing a hydrocarbon gas, comprising at least one of $CH_4$, $C_2H_4$ and $C_2H_6$, plus an $H_2$ gas in the FBR in a temperature range T2=640–800° C.;

(5) allowing the first mixture comprising Si particles and $SiO_x$ particles to react with the hydrocarbon gas and with the $H_2$ gas in the FBR to form a substance comprising SiC and $SiO_x$, whereby at least a portion of the first mixture is converted to a second mixture comprising SiC particles and $SiO_x$ particles, wherein a temperature during the reaction of the first mixture with the hydrocarbon gas and with the $H_2$ gas in the FBR is no higher than 800° C.;

(6) providing a layer of the second mixture, having an initial thickness τ1 at least equal to a selected threshold thickness τ1(thr), on an exposed surface of a heat shield system;

(7) permitting the layer of the second mixture to receive radiation from a source of radiation; and (8) permitting the layer of the second mixture to serve as an optical reflector to reflect a portion of the radiation received.

2. The method of claim 1, further comprising choosing said pore-to-pore spacing D1≥200 nm.

3. The method of claim 1, further comprising choosing said pore-to-pore spacing D2≤300 nm.

4. The method of claim 1, wherein said hydrocarbon gas contains $C_2H_6$, $C_2H_4$ or a combination thereof.

5. The method of claim 1, further comprising limiting said first temperature to a range, T1=600–640° C.

6. The method of claim 1, further comprising choosing said threshold thickness τ1(thr) that is sufficient so that, after exposure of said second mixture to said radiation for a selected time interval length Δt, a portion of said second mixture remains on said exposed surface.

7. A method for providing a thermal protection component for a space vehicle that enters or re-enters an atmosphere, the method comprising:

(1) providing a plurality of particles, comprising Mg, and a powder bed of frustules of $SiO_x$ (x≥1) from diatom shells in a heated fluidized bed reactor (FBR), where at least one diatom shell has average nearest neighbor pore-to-pore spacing d(p-p) that lies in a selected range, D1≤d(p-p)≤D2, with D1≥100 nm and D2≤400 nm;

(2) heating the plurality of particles and the $SiO_x$ powder bed to a first temperature no greater than about 800° C., and allowing at least a portion of the particles and the $SiO_x$ powder bed to react to form MgO and Si;

(3) leaching MgO to provide a first mixture comprising Si particles and $SiO_x$ particles;

(4) providing a hydrocarbon gas, comprising at least one of $CH_4$, $C_2H_4$ and $C_2H_6$, plus an $H_2$ gas in the FBR in a temperature range T2=640–800° C.;

(5) allowing the first mixture comprising Si particles and $SiO_x$ particles to react with the hydrocarbon gas and with the $H_2$ gas in the FBR to form a substance comprising SiC and $SiO_x$, whereby at least a portion of the first mixture is converted to a second mixture comprising SiC particles and $SiO_x$ particles, wherein a temperature during the reaction of the first mixture with the hydrocarbon gas and with the $H_2$ gas in the FBR is no higher than 800° C.;

(6) depositing the second mixture in a plurality of isolated clusters, at least one cluster having an initial thickness τ1 at least equal to a selected threshold thickness τ1(thr), on an exposed surface of a heat shield system;

(7) permitting the deposit of the second mixture to receive radiation from a source of radiation; and (8) permitting the deposit of the second mixture to serve as an optical reflector to reflect a portion of the radiation received.

8. The method of claim 7, further comprising choosing said pore-to-pore spacing D1≥200 nm.

9. The method of claim 7, further comprising choosing said pore-to-pore spacing D2≤300 nm.

10. The method of claim 7, wherein said hydrocarbon gas contains $C_2H_6$, $C_2H_4$ or a combination thereof.

11. The method of claim 7, further comprising limiting said first temperature to a range, T1=600–640° C.

12. The method of claim 7, further comprising choosing said threshold thickness τ1(thr) that is sufficient so that, after exposure of said second mixture to said radiation for a selected time interval length Δt, a portion of said second mixture remains on said exposed surface.

* * * * *